United States Patent
Biddle (10) Patent No.: US 11,624,132 B2
(45) Date of Patent: *Apr. 11, 2023

(54) CURVED PREFORM AND METHOD OF MAKING THEREOF

(71) Applicant: Albany Engineered Composites, Inc., Rochester, NH (US)

(72) Inventor: Stephen Biddle, Alton, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/193,180

(22) Filed: Mar. 5, 2021

(65) Prior Publication Data
US 2021/0189612 A1 Jun. 24, 2021

Related U.S. Application Data

(63) Continuation of application No. 16/964,056, filed as application No. PCT/US2019/044582 on Aug. 1, 2019, now Pat. No. 11,035,059.
(Continued)

(51) Int. Cl.
*A62B 17/00* (2006.01)
*D03D 3/08* (2006.01)
(Continued)

(52) U.S. Cl.
CPC ............. *D03D 3/08* (2013.01); *D03D 1/00* (2013.01); *D03D 25/005* (2013.01); *D03D 49/20* (2013.01); *D03J 1/22* (2013.01); *D10B 2505/02* (2013.01)

(58) Field of Classification Search
CPC .......... D03D 3/08; D03D 1/00; D03D 25/005; D03D 49/20; D03D 1/0035; D03J 1/22; D10B 2505/02
See application file for complete search history.

(56) References Cited

U.S. PATENT DOCUMENTS

| | | | | |
|---|---|---|---|---|
| 956,725 | A | * | 5/1910 | Northrup .................. D03J 1/22 139/293 |
| 1,319,819 | A | | 10/1919 | Williams |

(Continued)

FOREIGN PATENT DOCUMENTS

| | | |
|---|---|---|
| CN | 103260867 A | 8/2013 |
| CN | 103998665 A | 8/2014 |

(Continued)

OTHER PUBLICATIONS

"Strength of Materials", DT-Online, http://wiki.dtonline.org/index.php/Strength_of_Materials, accessed Sep. 2, 2020, 11 pages.
(Continued)

*Primary Examiner* — Robert H Muromoto, Jr.
(74) *Attorney, Agent, or Firm* — McCarter & English, LLP (57) ABSTRACT

Embodiments for clamps and shaping clamp systems are disclosed herein and drawn to such applications as, including but not limited to, an apparatus and method for forming three-dimensional woven preforms that can be curved and have continuous fibers in the direction of curvature. Embodiments of the clamps may include an upper clamp, and a lower clamp of complementary shape and mateable with the upper clamp, with the clamp being configured to receive a fabric therebetween.

16 Claims, 12 Drawing Sheets

Related U.S. Application Data (60) Provisional application No. 62/713,206, filed on Aug. 1, 2018.

(51) Int. Cl.
    *D03D 1/00*     (2006.01)
    *D03D 25/00*     (2006.01)
    *D03D 49/20*     (2006.01)
    *D03J 1/22*     (2006.01)
    *A41D 13/00*     (2006.01)

(56) References Cited

U.S. PATENT DOCUMENTS

| | | | |
|---|---|---|---|
| 1,409,892 A | 3/1922 | Clark et al. | |
| 2,113,557 A * | 4/1938 | Wilson | D03J 1/22 |
| | | | 122/182.1 |
| 3,016,068 A | 1/1962 | Felix | |
| 3,132,671 A | 5/1964 | Koppelman et al. | |
| 3,258,037 A * | 6/1966 | Brown, Jr. | D03J 1/22 |
| | | | 139/298 |
| 3,455,343 A * | 7/1969 | Golobart | D03J 1/22 |
| | | | 139/294 |
| 3,901,290 A * | 8/1975 | Jindra | D03J 1/22 |
| | | | 139/294 |
| 4,759,985 A | 7/1988 | Armiger et al. | |
| 4,922,968 A | 5/1990 | Bñttger et al. | |
| 4,949,761 A | 8/1990 | Fleury et al. | |
| 5,021,281 A | 6/1991 | Bompard et al. | |
| 5,394,906 A | 3/1995 | Farley | |
| 5,586,400 A * | 12/1996 | Moore, III | D05C 9/04 |
| | | | 38/102.2 |
| 5,800,514 A | 9/1998 | Nuñez et al. | |
| 5,904,714 A | 5/1999 | Nuñez et al. | |
| 6,136,022 A | 10/2000 | Nuñez et al. | |
| 6,182,398 B1 | 2/2001 | Head | |
| 6,659,138 B2 | 12/2003 | Wendisch et al. | |
| 7,014,805 B1 | 3/2006 | Reis et al. | |
| 7,045,084 B1 * | 5/2006 | Reis | B29B 11/16 |
| | | | 264/258 |
| 7,153,792 B2 | 12/2006 | Sahlin et al. | |
| 7,175,795 B2 | 2/2007 | Eberth et al. | |
| 8,074,692 B2 | 12/2011 | Lopez-Carrasco Picado et al. | |
| 8,440,276 B2 | 5/2013 | Rose et al. | |
| 8,663,776 B2 | 3/2014 | Goering et al. | |
| 8,771,567 B2 | 7/2014 | Piepenbrock et al. | |
| 8,883,660 B2 | 11/2014 | Goering | |
| 8,944,128 B2 | 2/2015 | Glain et al. | |
| 8,969,223 B2 | 3/2015 | Goering et al. | |
| 9,186,842 B2 | 11/2015 | Witte et al. | |
| 9,186,850 B2 | 11/2015 | Goering | |
| 9,518,356 B2 | 12/2016 | Sundermann et al. | |
| 10,190,240 B2 | 1/2019 | Goering et al. | |
| 10,279,534 B2 | 5/2019 | Stahl et al. | |
| 11,035,059 B2 * | 6/2021 | Biddle | D03D 25/005 |
| 2003/0106777 A1 * | 6/2003 | Davis | B65H 23/028 |
| | | | 198/494 |
| 2008/0216974 A1 * | 9/2008 | Pitcher | G09F 15/0025 |
| | | | 160/330 |
| 2011/0086565 A1 | 4/2011 | Goering | |
| 2012/0100321 A1 | 4/2012 | Goering et al. | |
| 2012/0189798 A1 | 7/2012 | Goering et al. | |
| 2014/0315457 A1 | 10/2014 | Marchal et al. | |
| 2015/0132487 A1 | 5/2015 | Goering et al. | |
| 2017/0175308 A1 | 6/2017 | Provost et al. | |
| 2020/0378041 A1 * | 12/2020 | Biddle | D03D 49/20 |
| 2021/0189612 A1 * | 6/2021 | Biddle | D03D 49/20 |

FOREIGN PATENT DOCUMENTS

| | | |
|---|---|---|
| CN | 204980518 U | 1/2016 |
| RU | 2598941 C2 | 7/2012 |

OTHER PUBLICATIONS

International Search Report and Written Opinion issued for International Application PCT/US2019/044582 by the European Patent Office, acting as the International Searching Authority, dated Nov. 14, 2019.

* cited by examiner

CURVED PREFORM AND METHOD OF MAKING THEREOF

CROSS-REFERENCE TO RELATED APPLICATION APPLICATIONS

This application is a continuation of U.S. patent application Ser. No. 16/964,056 filed on Jul. 22, 2020, which is the National Stage entry under 35 U.S.C. § 371 of International Application Number PCT/US2019/044582 filed on Aug. 1, 2019, published on Feb. 6, 2020 under publication number WO 2020/028613 A1, which claims the benefit of priority of U.S. Provisional Application Ser. No. 62/713,206 filed Aug. 1, 2018, which are hereby incorporated by reference in its their entireties.

BACKGROUND

1. Field

This disclosure relates to woven preforms and particularly relates to woven preforms used in reinforced composite materials. More particularly, the present invention relates to woven preforms that are curved with continuous fiber reinforcement.

2. Related Art

The use of reinforced composite materials to produce structural components is now widespread, particularly in applications where their desirable characteristics of light weight, high strength, toughness, thermal resistance, and ability to being formed and shaped can be used to great advantage. Such components are used, for example, in aeronautical, aerospace, satellite, high performance recreational products, and other applications.

Typically, such components consist of reinforcement materials embedded in matrix materials. The reinforcement component may be made from materials such as glass, carbon, ceramic, aramid, polyester and/or other materials that exhibit desired physical, thermal, chemical and/or other properties, chief among which is strength against stress failure.

Through the use of such reinforcement materials, which ultimately become a constituent element of the completed component, the desirable characteristics of the reinforcement materials, such as high strength, are imparted to the completed composite component. The typical constituent reinforcement materials may be woven, knitted or otherwise oriented into desired configurations and shapes for reinforcement preforms. Usually particular attention is paid to ensure the optimum utilization of the properties for which the constituent reinforcing materials have been selected.

After the desired reinforcement preform has been constructed, matrix material may be introduced into the preform so the reinforcement preform becomes encased in the matrix material and matrix material fills the interstitial areas between the constituent elements of the reinforcement preform. The reinforcement preform combined with matrix material can form desired finished components or to produce working stock for the ultimate production of finished components.

The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal and/or other properties. Typically, however, they will not be of the same materials or have comparable physical, chemical, thermal, or other properties, because a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform).

A common method of producing a woven preform is to weave a two dimensional ("2D") structure and fold it into a three dimensional ("3D") shape. A benefit of folded preforms is the strength of the joint between the panel to be reinforced and the reinforcing panel. As they are woven together, the panels share reinforcing material and in the final composite, matrix material, creating a unitary construction. The juncture between the integrally woven reinforcement flange or leg and the parent material or base is no longer the weak link, relying solely upon the strength of the adhesive for the strength of the joint, as in the prior-art reinforcements. Instead, the fibers of the preform integrally weave the legs and the base together.

Frequently, however, complex shapes, such as curves, require reinforcement. Folded T- or Pi-shaped and other preform reinforcements having a flange base with one or more upstanding legs require darting of the legs in order to accommodate a curved surface. As the flange material of a folded preform assumes a curved shape, the length of the curved surface necessarily varies from the inside of the curvature to the outside of the legs. The arc length of outside of the curvature, the surface with the larger radius when curved, increases, while on the inside of the curvature, the arc length decreases. The legs of typical folded preforms cannot change length as required to accommodate a curved surface. To accommodate a curved surface, the legs must be darted. That is, the legs must be cut or have discontinuous fibers in order to allow the leg to conform to the changed arc length.

Typically, the cut is along the localized radius of curvature, but other, non-radial cuts may also be used to accommodate the change in length. To allow for the decreased length on the inside of a curved preform, the leg is cut and the cut edges allowed to overlap, or the excess material is removed. Similarly, to accommodate the increased length on the outside of the curvature, the leg is cut, resulting in a triangular gap between cut edges of the leg. In either configuration, the darting breaks the continuity of the reinforcing fibers in each leg. Darting the legs of a 3D T- or Pi-preform can degrade the load carrying capabilities of the preform, because darting involved cutting the fibers that provide the primary load path around the curve.

SUMMARY OF THE DISCLOSURE

A method of forming a curved preform includes applying at least one set of mating clamps to fibers of a preform fabric advancing from a loom, the at least one pair of mating clamps capturing at least a portion of the preform fabric there between. The at least one set of clamps having a geometry to increase a length of fibers by pulling at least some of the fibers advancing from the loom. The preform fabric is shaped into a curve. And the fibers are continuous along a length of the fabric. In some embodiments, the length of the fibers is greater at an outside of the curve than at an inside of the curve. In other embodiments, the length of the fibers is shorter at an outside of the curve than at an inside of the curve.

In one embodiment, each set of mating clamps is a pair of clamps. In another embodiment, each set of mating clamps is at least three clamps. The mating clamps may include an upper clamp portion and a lower clamp portion. In certain embodiments, the lower clamp portion comprises at least two mating parts.

In certain embodiments, there are at least two sets of mating clamps applied to the preform fabric. A force is applied to each set of mating clamps to compress the preform fabric there between. Adjacent mating clamps may be mated to one another. The two or more sets of mating clamps can be disposed in separate locations of the preform fabric to increase the length of the fibers in each of the separate locations but not in other locations.

In other embodiments, described herein are curved woven preforms, for example, a curved woven preform comprising a plurality of weft fibers and a plurality of warp fibers interwoven with the plurality of weft fibers to form a base of the preform, wherein the base of the preform is curved with the warp fibers continuous across the length of the preform and some of the warp fibers are longer than other warp fibers.

In certain embodiments, the curvature of the woven preform is convex, the length of the warp fibers being greater towards an outside of the curve of the preform than towards an inside of the curve of the preform. In a further embodiment, the preform comprises at least one leg integrally woven with the base and curved along a length of the base, wherein warp fibers forming the at least one leg are greater towards an outside curve of the at least one leg than towards an inside curve of the at least one leg.

In other embodiments, the curvature of the woven preform is concave, the length of the warp fibers being shorter towards an outside of the curve of the preform than towards an inside of the curve of the preform. In a further embodiment, the preform comprises at least one leg integrally woven with the base and curved along a length of the base, wherein warp fibers forming the at least one leg are shorter towards an outside curve of the at least one leg than towards an inside curve of the at least one leg.

The instant invention also relates to clamps, such as an upper clamp mateable with a lower clamp, wherein the upper clamp has a complementary shape to mate with the lower clamp and configured to receive a fabric therebetween. In another embodiment, the invention relates to an upper clamp having a blade portion and a lower clamp separable and mateable with the upper portion, the lower clamp having a lower clamp first part and a lower clamp second part, wherein the lower clamp first and second parts have a gap therebetween such that the blade portion of the upper clamp enters into the gap when the upper and lower clamps are mated together.

In yet other embodiments, the invention relates to a shaping clamp system comprising two or more clamps, each clamp having an upper clamp portion and a lower clamp portion and an integral connecting portion, wherein the two or more clamps are connectable to one another by the connecting portion and configured to receive a fabric therebetween. In certain embodiments, the invention relates to a shaping clamp system comprising two or more clamps, each clamp having an upper clamp portion with a blade portion and a lower clamp portion, each clamp including an integral connecting portion, wherein each lower clamp is separable and mateable with a respective upper clamp, the lower clamp having a lower clamp first part and a lower clamp second part with a gap therebetween to receive the blade portion when the upper clamp and lower clamp are mated together, wherein the two or more clamps are connectable to one another by the connecting portion and configured to receive a fabric therebetween.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", "tows", and "yarns" are used interchangeably in the following description. "Threads", "fibers", "tows", and "yarns" as used herein can refer to monofilaments, multifilament yarns, twisted yarns, multifilament tows, textured yarns, braided tows, coated yarns, bicomponent yarns, as well as yarns made from stretch broken fibers of any materials known to those ordinarily skilled in the art. Yarns can be made of carbon, nylon, rayon, fiberglass, cotton, ceramic, aramid, polyester, metal, polyethylene glass, and/or other materials that exhibit desired physical, thermal, chemical or other properties.

The term "folded" is broadly used herein to mean "forming," which includes unfolding, bending, and other such terms for manipulating the shape of a fabric.

For a better understanding of the invention, its advantages and objects attained by its uses, reference is made to the accompanying descriptive matter in which non-limiting embodiments of the invention are illustrated in the accompanying drawings and in which corresponding components are identified by the same reference numerals.

Disclosed is a method for creating curved preforms of continuous fiber on a conventional straight loom take-up. Machine woven fabrics are created using a loom that includes a weaving mechanism coupled with a method for advancing and collecting the finished fabric. "Straight take-up" means the fabric is collected in the warp or machine direction (MD) in short lengths adapted for weaving discrete preforms.

Typical shapes woven with the straight take-up include Pi-shaped or T-shaped preforms used as structural reinforcement members in a variety of applications. These shapes being made of continuous fiber in both the warp and weft directions can be difficult to form into a geometry or curved shape in the warp or take-up direction.

Figure 1A:
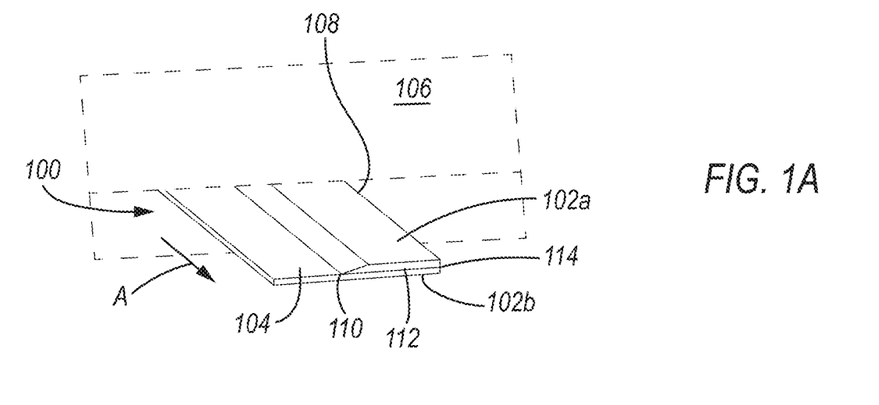
FIGS. 1A-1C illustrate an example of a T-preform as woven and folded into a final shape.
Figure 1B:
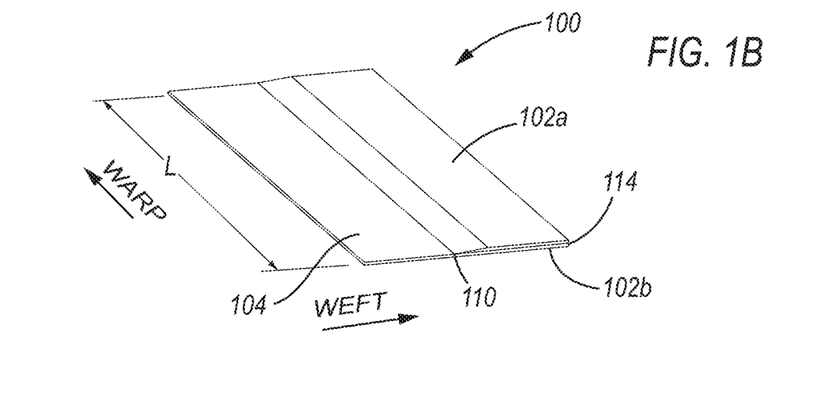
Figure 1C:
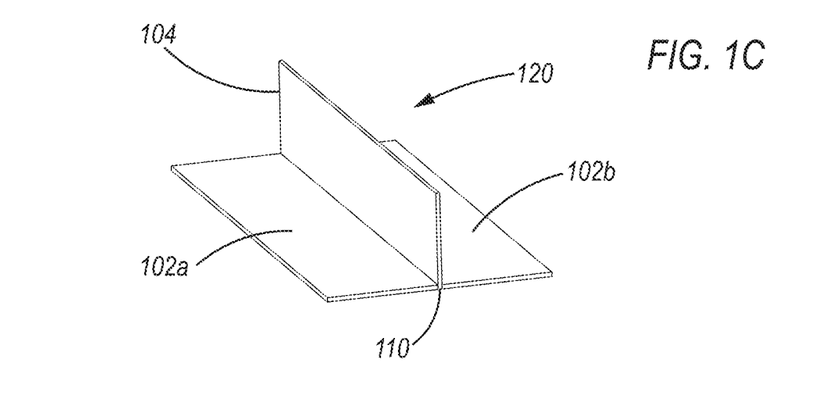

As an example, FIGS. 1A-1C illustrate a simplified version of forming a T-preform from T-preform fabric 100. Warp and weft fibers are interwoven in a loom 106, illustrated by the dotted lines. As the T-preform fabric is woven, the fabric advances in the direction A towards a take-up roll (not shown) for receiving the completed fabric. The portion of the fabric that has already been formed but not yet rolled up on the take-up roll is called the "fell" 108.

The T-preform fabric includes base portions 102a, 102b and leg portion 104. A root 110 of leg portion 104 may be interwoven with base portions 102a, 102b. Base portions 102a, 102b are not interwoven at their intersection 114 and the remainder of the leg portion 104 is not interwoven with the base portions other than at their intersection 110. The T-preform fabric 100 is woven and advances toward and onto the take-up roll. Once a desired length L of the T-preform fabric is woven, the fabric may be removed from the loom. Base portions 102a, 102b, and leg portion 104 can be folded to form T-preform 120.

Other preform shapes including, but not limited to, Pi, H, O, and I can be woven and folded into their final form as known to those of ordinary skill. Any of the preforms can be impregnated with a matrix material to form a composite.

Figure 2A:
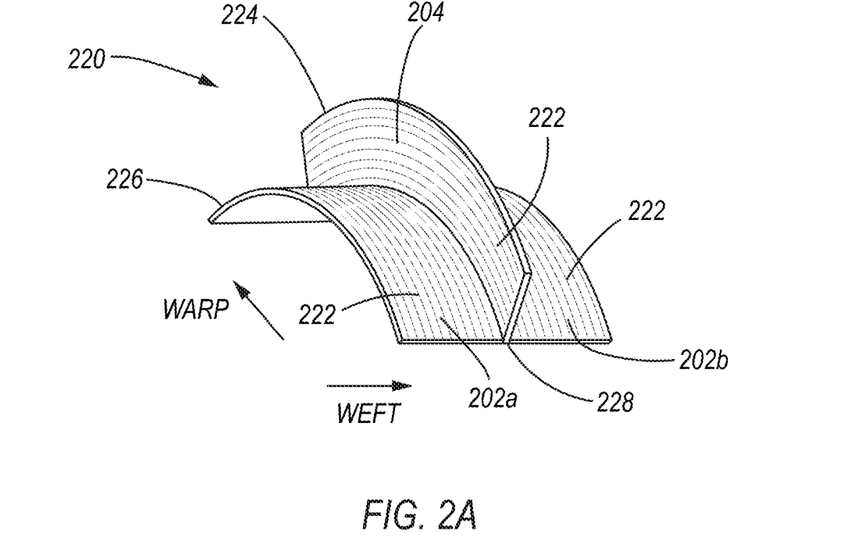
FIGS. 2A-2B illustrate an example of a curved T-preform.

FIG. 2A illustrates an example of a curved preform. For purposes of discussion, the curve illustrated in FIG. 2A and other figures is referred to as being "convex." Accordingly, the example is of a convex T-shaped preform but other preform shapes including, but not limited to, Pi, H, O and I are contemplated. Similar to the fabric in FIG. 1, the T-preform fabric includes base portions 202a, 202b and leg portion 204. Base portions 202a, 202b and leg portion 204 are folded to form T-preform 220.

Figure 2B:
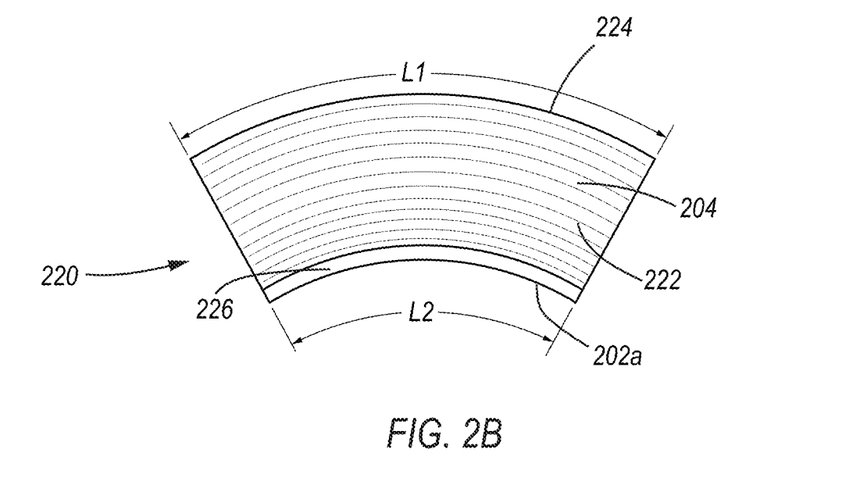

Base portions 202a, 202b and leg portion 204 are woven from warp fibers 222. As shown in FIG. 2B, the length L2 of warp fibers 222 in the warp direction are shorter towards the inside or root 226 of the curved T-preform than towards the outside or tip 224 of the curved T-preform. Accordingly, in order to curve a preform woven as in FIG. 1, the fiber length in the warp direction must be greater at the tip of the curved preform than at the root of the curved preform.

While curved preforms are known in the art, these prior-art preforms required cutting of fibers or making the length from discontinuous short fibers, such as stretch broken fibers, to enable the preform to be stretched or curved to provide additional length of the preform towards the outside of the curvature as compared with towards the inside of the curvature. There is a weakening, a loss of strength, of the preform due to the cutting and/or discontinuity of the fibers in providing the additional length.

In contrast, the present disclosure provides preforms and a process for weaving preforms with additional length of fibers so the finished structure can be curved and have continuous fiber reinforcement in the direction of the curvature. Continuous fibers provide greater preform strength than discontinuous fibers. "Continuous fibers" are fibers having no breaks along the entire length of the fabric. In embodiments of the present disclosure, the fibers of the fabric are continuous in the direction of curvature of the preform and can have varying lengths across the width of the fabric. The varying lengths across the preform fabric width enable forming a curved portion in the length of the fabric without cutting the fibers or having the fibers discontinuous to form the curved portion.

For the purposes of this disclosure, the direction of curvature of the preform will be assumed to be along the warp or machine direction (MD) of the fabric. However, it is contemplated that the disclosed technique may be used to effect curvature of the fabric in the weft or cross-machine direction (CD) alone or in combination with the warp direction.

To create this curvature, according to an embodiment of the present disclosure, the length of the fibers in upright leg 204 is made longer towards the outside tip 224 of the preform upright leg than the inside root 226 of the preform leg by applying one or more clamps to the fabric as the fabric comes off of the loom. The clamps may be applied in the fell of the cloth. The shape of the clamps is designed to draw additional fiber length into the preform to accommodate an increase in length of the fibers to enable curvature of the preform when the preform is formed to the desired shape.

Figure 10:
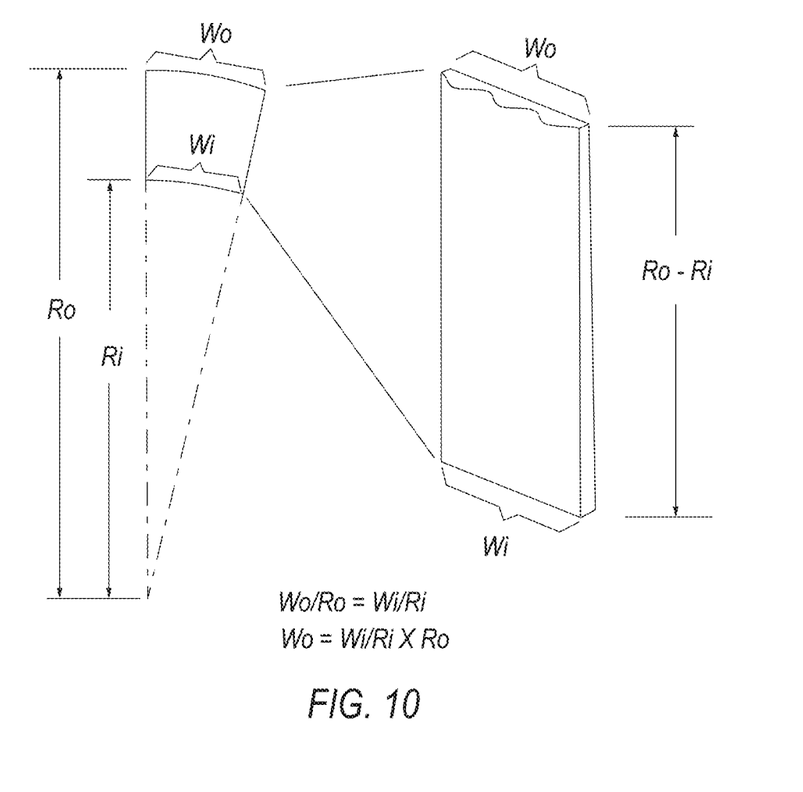
FIG. 10 illustrates an example of a clamp design according to the instant invention.

In embodiments of the instant invention, each clamp incrementally increases the length of the warp fibers coming off the loom. In the clamp depicted in FIG. 10, for example, to accommodate the longer radius of the outside of a preform curvature (Ro) versus the shorter radius of the inside of the curvature (RD, the clamp is designed such that as each clamp segment is applied to the warp fibers coming off the loom, the resulting length of the warp fiber on the inside (Wi) of the preform curvature is shorter than the warp fiber on the outside (Wo) of the preform curvature. The resulting difference in length of the fibers, Wo and Wi, is shown.

Figure 8A:
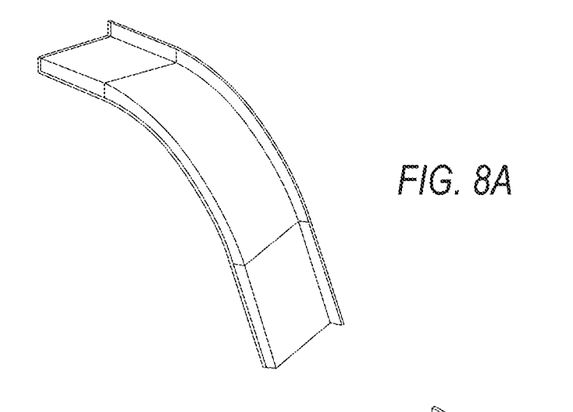
FIGS. 8A-8E illustrate examples of preforms having complex geometries that may be formed.
Figures 8B, 8C:
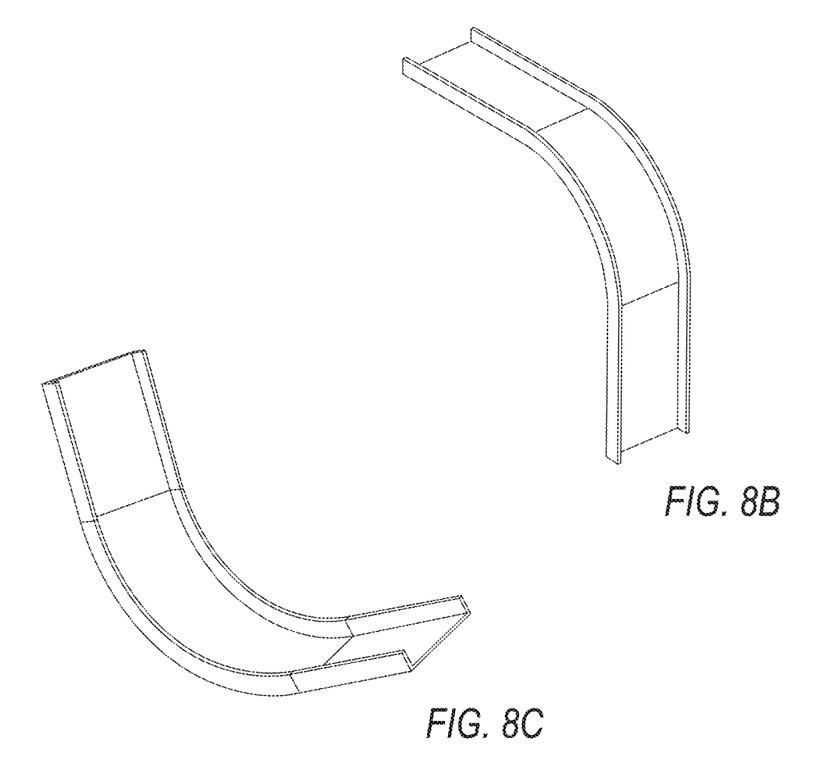
Figures 8D, 8E:
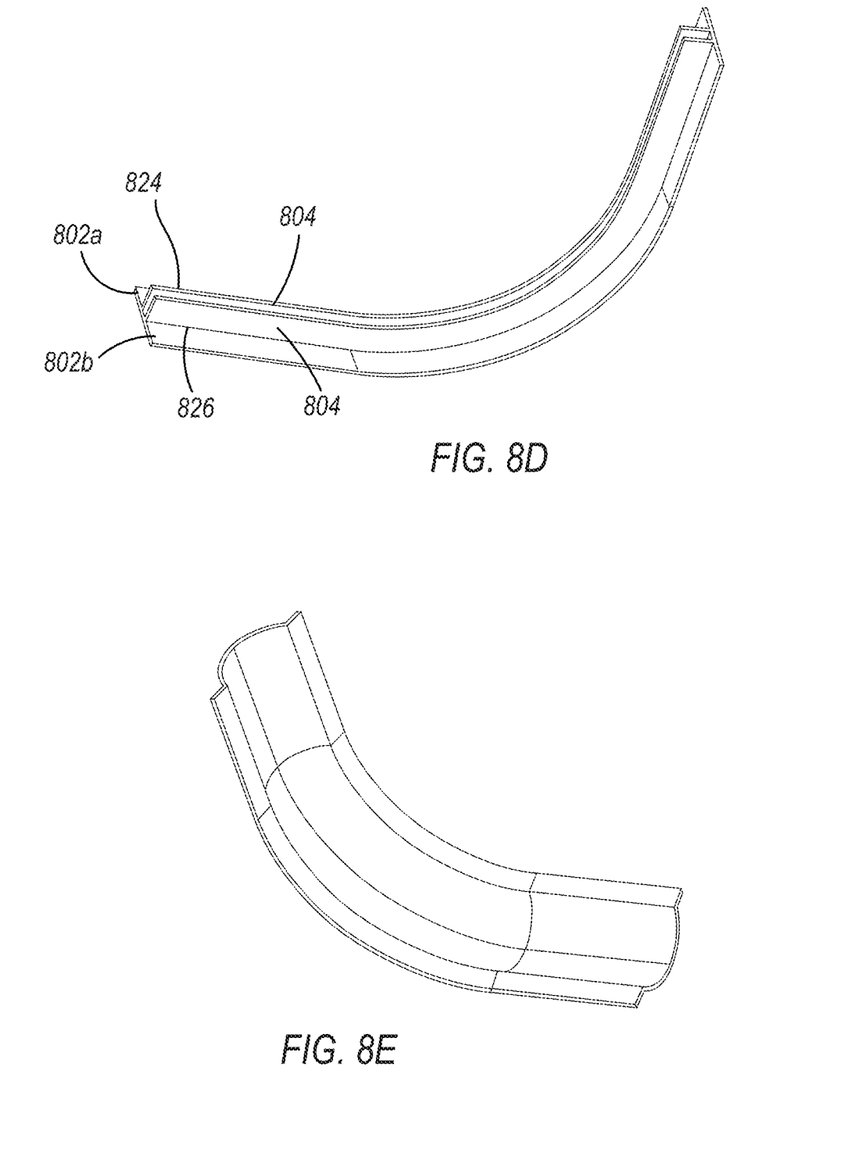

It is contemplated that the preform fabric can be made concave as illustrated in the examples of FIGS. 80, 8D, and 8E. In embodiments of concave preform fabrics such as FIG. 8D having base portions 802a, 802b, the lengths of the warp fibers forming the upright legs 804 would be opposite to that of the convex preform fabric. That is, the length of the fibers in upright legs 804 are shorter towards the outside tip 824 of the preform upright leg than towards the inside root 826 of the preform leg. Those of ordinary skill in the art will appreciate the general understanding that the geometry of the final preform shape determines the necessary length of fibers across the preform length to enable forming the required curvature. Altering of the length of the fibers so that they, are continuous across the length of the fabric distinguishes forming preform fabrics according to the present disclosure from the discontinuous fibers across the length of prior-art curved preforms.

Figure 3:
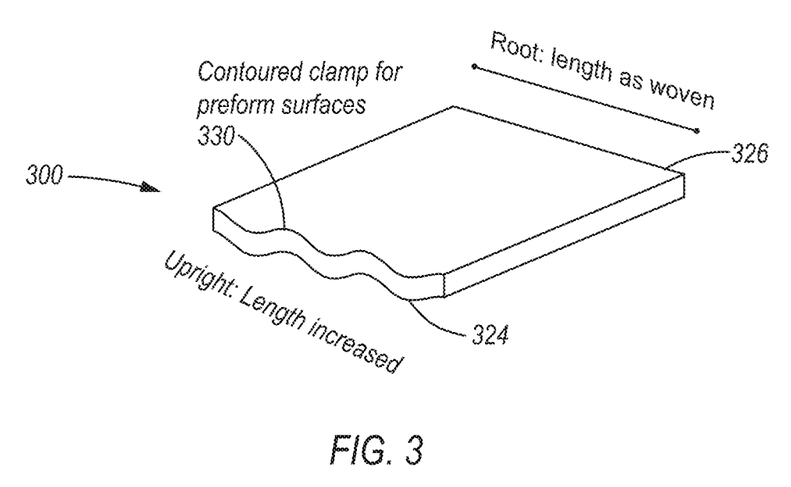
FIG. 3 illustrates an example of a clamp geometry to increase the length of fibers in the tip of a preform as compared with the root of the preform.

FIG. 3 illustrates an example of a clamp element 300. The clamp 300 is applied to the preform fabric exiting the loom. The clamp is oriented on the preform fabric so that a clamp root end 326 is applied to the root end of an upright leg and a clamp tip end 324 is applied to the tip end of the upright leg. For a convex curvature as in FIGS. 1 and 2, the clamp root end is straight, which does not increase the length of the fibers because the root end of the T-preform upright leg has the shortest length of fibers in the curved preform. The clamp tip end has a geometry or shape to lengthen the preform fabric fibers of a convex curvature. That is, the geometry of the clamp causes added fiber take-up length to be drawn from the loom to traverse across towards the clamp tip end than towards the clamp root end. The geometry is more pronounced—causing greater fiber take-up length to be drawn from the loom—at the clamp tip end because the tip end of a convex preform with an upright leg(s) has the longest fibers in the curved preform. The geometry of the clamp is reduced towards the clamp root end as the length of the fibers are shorter towards the root of the curved preform. In this way the fibers are longest at the tip of the curved preform fabric upright leg and shortest at the root. Of course, the geometry of the clamp is reversed with respect to the upright leg of a preform with concave curvature.

The clamps are typically assembled on the preform fabric in sets. Each set of clamps includes two or more clamps having mating geometries. The clamping action of sandwiching the preform fabric between the set of clamps draws additional fiber take-up length through the loom. The clamp set geometries are tapered such that the take-up length increases from the root (inside curve of the preform) to the tip of an upright leg(s) (outside curve of the preform) for a preform with convex curvature (reversed clamp geometry for a preform with concave curvature). The increase in length of the fibers can enable forming of the preform fabric into the curved preform of FIG. 2 with continuous lengths of fibers throughout the curved preform. The curvature of the preform is achieved with continuous lengths of fibers and not weakened by cutting fibers or shortened fibers, such as stretch broken fibers.

The geometry of a clamp shown in FIG. 3 is for illustrative purposes only. Design considerations will determine the particular geometry selected for the clamps. Moreover, the geometry of the clamps can be varied over the length of a preform to provide for alternative contours or curvatures of the preform fabric over the length of the preform.

Figure 4A:
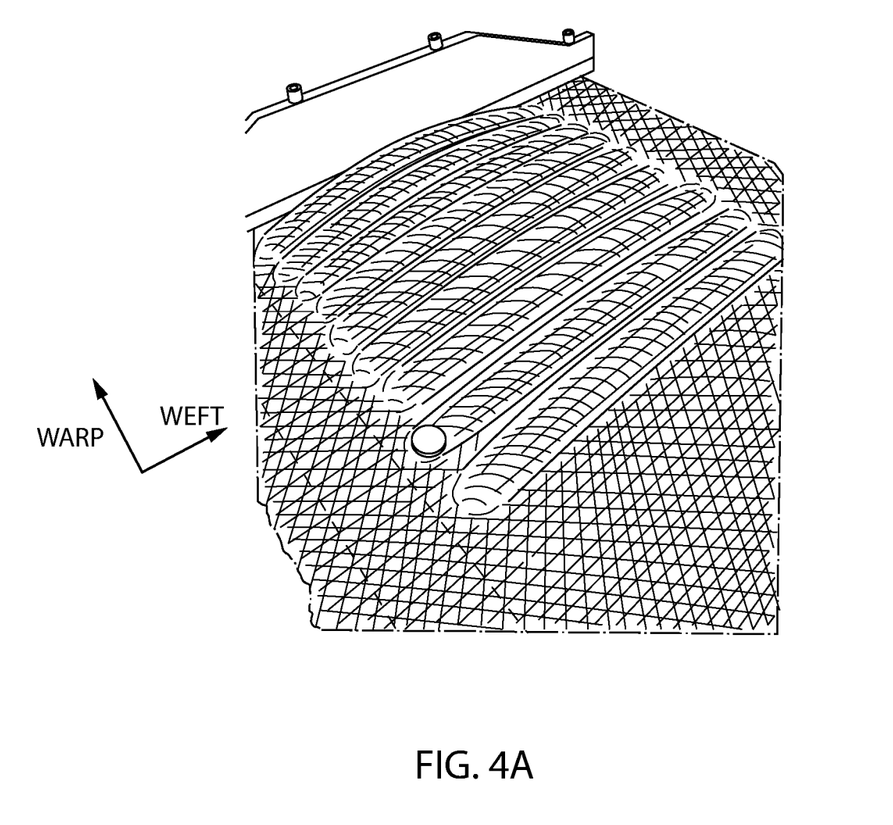
FIGS. 4A-4B illustrate a fabric having lengthened fibers between the fabric width edges.
Figure 4B:
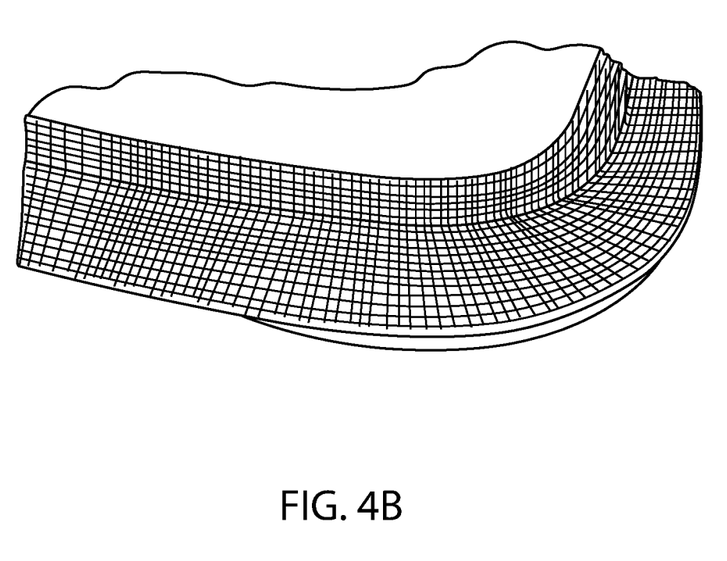

FIG. 4A illustrates a fabric where the clamp geometry has been arranged to provide a lengthening of the fibers anywhere along the width of the fabric. That is, the fibers may be lengthened between the width edges of the fabric to cause a curvature across the width of the fabric. In one embodiment, the clamp sets are arranged to cause a lengthening of the fibers toward the center of the fabric. In one embodiment, the preform fabric can be cut in the middle of the warp direction to create two curved preforms with continuous fiber along the length of curvature. As shown in FIG. 4B, in this embodiment, the curvature is arranged in the plane of the preform fabric. It is contemplated that clamp geometry could also be made to cause a lengthening of fibers in a multilayer fabric. Some of the layers can be folded into one or more upstanding legs from the plane or base of the preform fabric that follow the curvature of the plane of the preform fabric and shown in FIG. 2.

Figure 5:
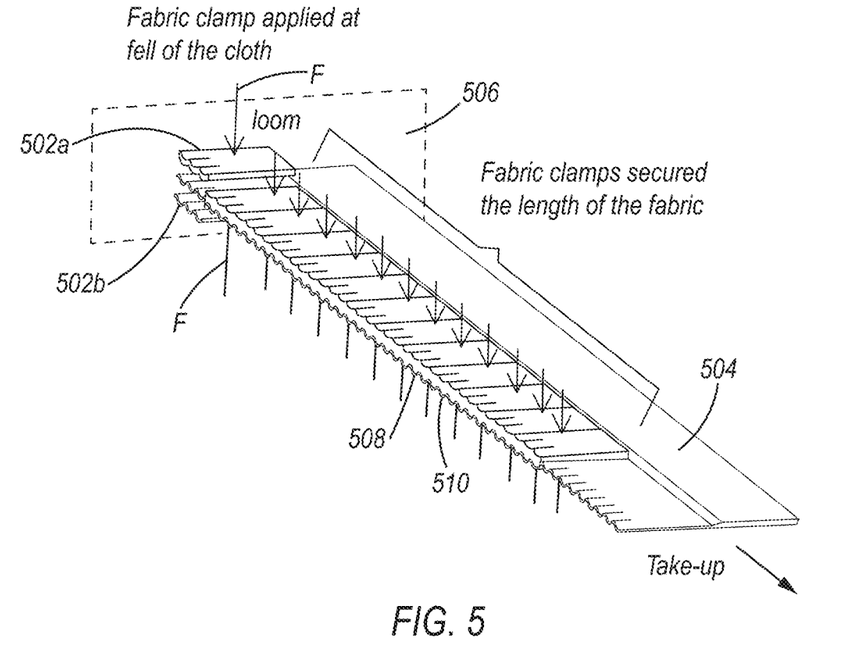
FIG. 5 illustrates application of pairs of mating clamps to a preform fabric to increase the length of fibers.

FIG. 5 illustrates an embodiment where the set of clamps is a pair of mating clamps 502a, 502b assembled on preform fabric 504 as the fabric exits the loom 506. These clamps may be held in place throughout the weaving process by a force F applied to the mating clamps to press the preform fabric between the clamps and vary the length of continuous fibers along the length of the preform. The force holding the clamp pairs together may be achieved in any manner known to those of ordinary skill including, but not limited to, screws and nuts, springs, etc. In one embodiment, adjacent clamp pairs, such as 508, 510, can be assembled to one another.

Figure 6:
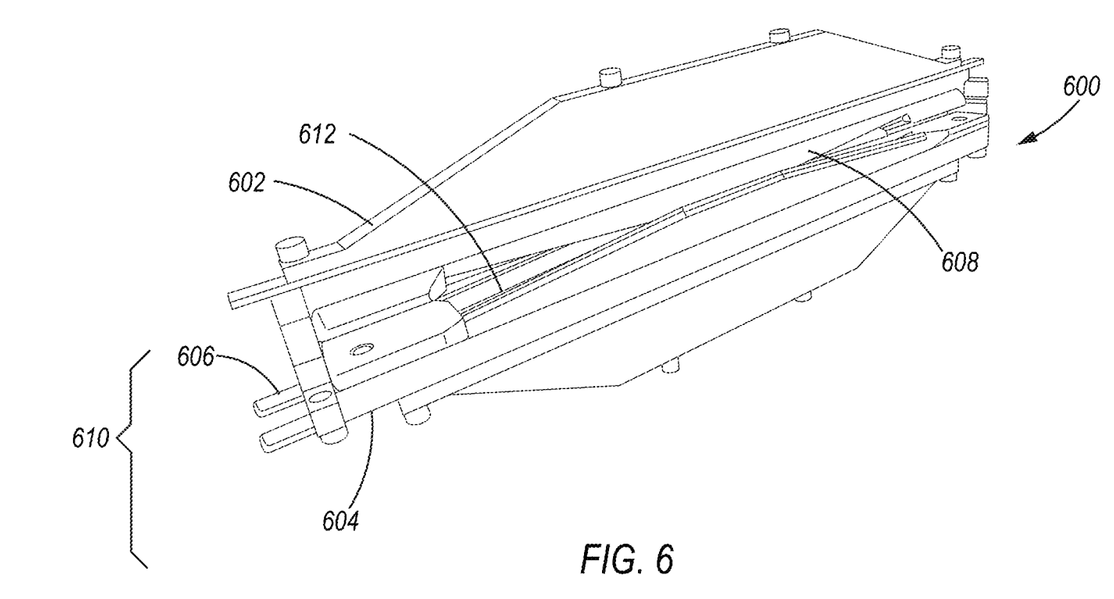
FIG. 6 illustrates another embodiment of a clamp for lengthening fibers of a preform fabric.

FIG. 6 illustrates an embodiment where a set of clamps 600 is arranged to intersect to lengthen the fibers when applied to a preform fabric. The set of clamps 600 includes an upper clamp 602 having a blade portion 608. A lower clamp 610 has portions 604, 606 having a gap 612 therebetween to receive blade portion 608. Lower clamp 610 may be a single piece or attached separate pieces. If separate pieces, clamp set 600 may be considered to have an upper clamp 602 and lower clamps 604, 606. An advantage of separate pieces for clamp set 600 is that each of the pieces may be mechanically the same to reduce cost of manufacturing and stocking the parts. Also, the gap 612 between lower clamps 604, 606 may be varied to accommodate differing preform fabric thicknesses.

Figure 7A:
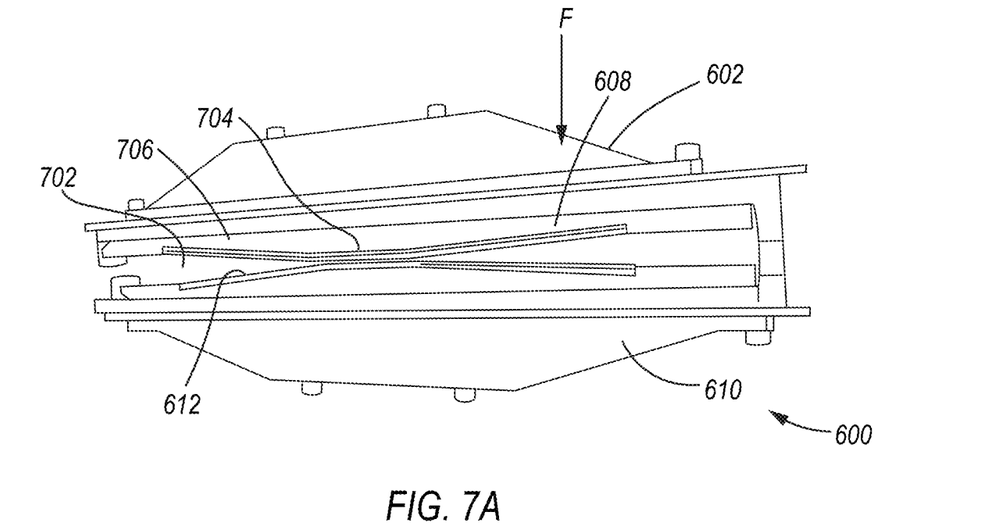
FIGS. 7A-7B illustrate application of the clamp of FIG. 6.
Figure 7B:
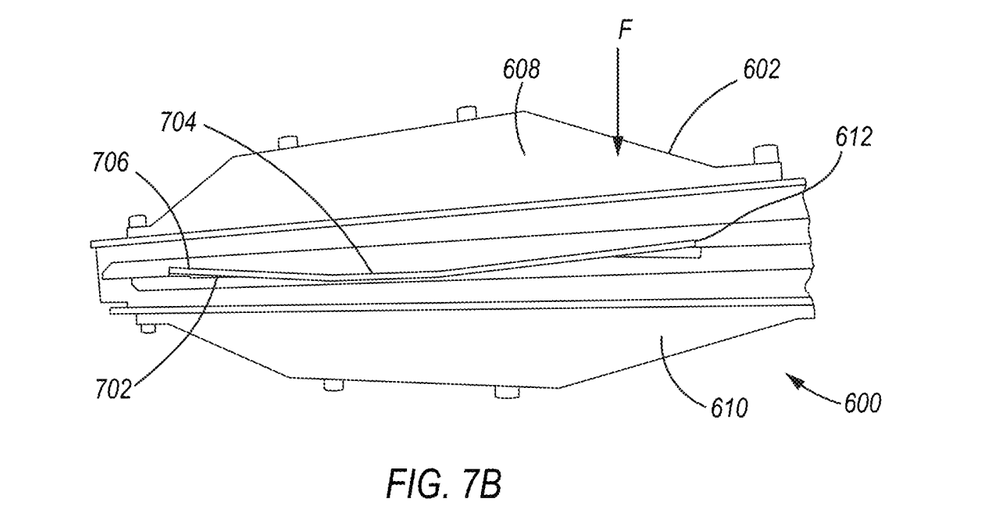

FIGS. 7A-7B illustrate the set of clamps 600 being brought together. In FIG. 7A the upper clamp 602 is arranged on top of the preform fabric (not shown for clarity) and lower clamp 610 is arranged beneath the preform fabric. The upper and lower clamps are separated by a distance 702 so that blade 608 of the upper clamp does not enter the gap 612 in the lower clamp.

The blade portion for a convex preform has a geometry to cause a lengthening of fabric fibers when applied. In an embodiment, the blade portion is more pronounced or bigger toward the center 704 than toward the end 706 of the blade portion. That is, the blade portion is shaped to cause fibers of the preform fabric to be longer to traverse the distance towards the more pronounced center of the blade than around the ends of the blade. As discussed above, the geometry of the blade portion would be opposite for a concave preform so that the fibers of the preform fabric will be shorter to traverse a distance towards a less pronounced center of the blade than around the ends of the blade.

A force F is applied to urge the upper and lower clamps together. As shown in FIG. 7B, the distance 702 is narrowed so blade portion 608 enters into the gap 612 in the lower clamp. Distance 702 is adjusted as necessary to enable passage of the preform fabric around the blade portion and intersection of the upper and lower clamps. The blade portion 608 causes the fibers of the preform fabric to be longer to traverse the distance towards the more pronounced center of the blade 704 than around the ends of the blade.

Figure 9:
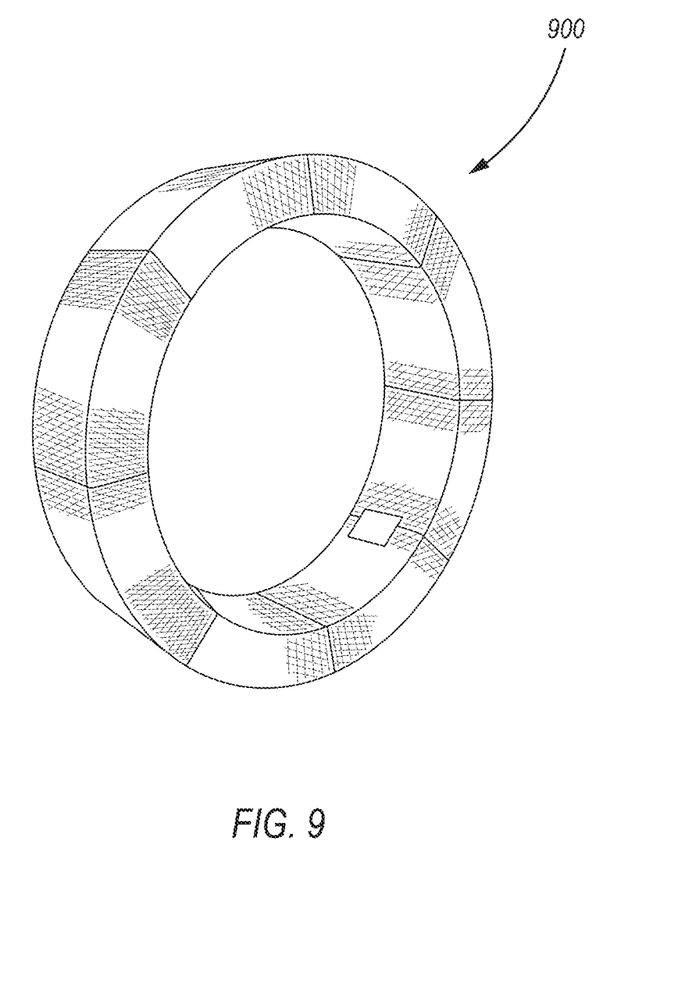
FIG. 9 illustrates an example of an O preform that may be formed.

While FIG. 2 illustrates an example that results in a fabric with a single curvature, it is possible to design a variety of clamp sets to achieve more complex geometries. For example, an oval shaped preform can be created by varying the amplitude of the clamp curvatures along the length of the preform. In FIG. 9, an example of an O preform 900 is shown that was made in accordance with the instant invention. It is contemplated that clamp pairs may be applied to some portions of the preform fabric and not to other portions. That is, additional fiber length may be pulled from the loom in some areas of the preform fabric and not in other areas of the preform fabric. In this way, complex geometries of preforms with curved and straight portions can be formed. Some examples of such complex shaped preforms are illustrated in FIG. 8.

Once the required fabric length is woven and the preform fabric is removed from the loom, any remaining clamps can be removed and the preform fabric shaped to the final configuration. In any of the embodiments, the final configuration can be impregnated with a matrix material. The matrix material includes epoxy, bismaleimide, polyester, vinylester, ceramic, carbon, and other such materials known to those of ordinary skill in the art.

Other embodiments are within the scope of the following claims.

The invention claimed is:

1. A clamp comprising:
an upper clamp; and
a lower clamp mateable with the upper clamp,
wherein the upper clamp has a complementary shape to mate with the lower clamp and configured to receive a fabric therebetween; and
wherein the upper and lower clamps define a first fiber path and a second fiber path therebetween, wherein at least one of the first fiber path and the second fiber path includes a contour to lengthen one or more fibers of the fabric received between the upper and lower clamps.

2. A shaping clamp system comprising:
two or more clamps, each clamp having an upper clamp portion and a lower clamp portion and an integral connecting portion,
wherein the two or more clamps are connectable to one another by the connecting portion and configured to receive a fabric therebetween; and
wherein the upper and lower clamp portions define a first fiber path and a second fiber path therebetween, wherein at least one of the first fiber path and the second fiber path includes a contour to lengthen one or more fibers of the fabric received between the upper and lower clamp portions.

3. A clamp comprising:
an upper clamp having a blade portion; and
a lower clamp separable and mateable with the upper portion, the lower clamp having a lower clamp first part and a lower clamp second part,
wherein the lower clamp first and second parts have a gap therebetween such that the blade portion of the upper clamp enters into the gap when the upper and lower clamps are mated together; and
wherein the upper and lower clamps define a first fiber path and a second fiber path therebetween, wherein at least one of the first fiber path and the second fiber path includes a contour to lengthen one or more fibers of a fabric received between the upper and lower clamps.

4. A shaping clamp system comprising:
two or more clamps, each clamp having an upper clamp portion with a blade portion and a lower clamp portion, each clamp including an integral connecting portion, wherein each lower clamp is separable and mateable with a respective upper clamp, the lower clamp having a lower clamp first part and a lower clamp second part with a gap therebetween to receive the blade portion when the upper clamp and lower clamp are mated together,
wherein the two or more clamps are connectable to one another by the connecting portion and configured to receive a fabric therebetween; and
wherein the upper and lower clamp portions define a first fiber path and a second fiber path therebetween, wherein at least one of the first fiber path and the second fiber path includes a contour to lengthen one or more fibers of the fabric received between the upper and lower clamp portions.

5. The clamp of claim 1, wherein the upper clamp and lower clamp comprise a tip end and a root end.

6. The clamp of claim 5, wherein the root end defines a longer fiber path than defined by the tip end.

7. The clamp of claim 5, wherein the tip end defines a longer fiber path than defined by the root end.

8. The shaping claim system of claim 2, wherein the two or more clamps comprise a tip end and a root end.

9. The shaping clamp system of claim 8, wherein the root end defines a longer fiber path than defined by the tip end.

10. The shaping clamp system of claim 8, wherein the tip end defines a longer fiber path than defined by the root end.

11. The clamp of claim 3, wherein the upper clamp and lower clamp comprise a tip end and a root end.

12. The clamp of claim 11, wherein the root end defines a longer fiber path than defined by the tip end.

13. The clamp of claim 11, wherein the tip end defines a longer fiber path than defined by the root end.

14. The shaping clamp system of claim 4, wherein the upper clamp and lower clamp comprise a tip end and a root end.

15. The shaping clamp system of claim 14, wherein the root end defines a longer fiber path than defined by the tip end.

16. The shaping clamp system of claim 14, wherein the tip end defines a longer fiber path than defined by the root end.

* * * * *